US011887549B2

(12) United States Patent
Jeon et al.

(10) Patent No.: US 11,887,549 B2
(45) Date of Patent: Jan. 30, 2024

(54) COLOR GAMUT MAPPING METHOD AND DEVICE

(71) Applicant: LX SEMICON CO., LTD., Daejeon (KR)

(72) Inventors: Hyun Kyu Jeon, Daejeon (KR); Ji Won Lee, Daejeon (KR); Ji Hong Yuk, Daejeon (KR); Chang Young Bae, Daejeon (KR); Seul Gi Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 254 days.

(21) Appl. No.: 17/453,373

(22) Filed: Nov. 3, 2021

(65) Prior Publication Data

US 2022/0139342 A1 May 5, 2022

(30) Foreign Application Priority Data

Nov. 5, 2020 (KR) .......................... 10-2020-0146559

(51) Int. Cl.
*G09G 3/34* (2006.01)
*G09G 3/36* (2006.01)
*G09G 5/10* (2006.01)

(52) U.S. Cl.
CPC ......... *G09G 3/3413* (2013.01); *G09G 3/3607* (2013.01); *G09G 5/10* (2013.01); *G09G 2320/0666* (2013.01); *G09G 2340/06* (2013.01)

(58) Field of Classification Search
CPC .............. G09G 3/2003; G09G 3/3413; G09G 3/3607; G09G 5/02–10;
(Continued)

(56) References Cited

U.S. PATENT DOCUMENTS 8,421,925 B2 4/2013 Su et al.
9,818,047 B1* 11/2017 Li ............................ H04N 9/68
(Continued)

FOREIGN PATENT DOCUMENTS

JP 2010-079285 A 4/2010
KR 10-2007-0063411 A 6/2007
(Continued)

*Primary Examiner* — Keith L Crawley
(74) *Attorney, Agent, or Firm* — Greenberg Traurig, LLP

(57) ABSTRACT

The present disclosure relates to a color gamut mapping method and a color gamut mapping device. A color gamut mapping method may include converting, by a color space converter, first three-color signals into a first luminance component and a pair of first chrominance components and outputting the first luminance component and the pair of first chrominance components, controlling, by a saturation controller, a saturation of the first chrominance component for each control area using a saturation gain of the saturation controller and outputting a second chrominance component, controlling, by a hue controller, a hue of the second chrominance component for each control area and outputting a third chrominance component, interpolating, by an overall controller, a set value of a luminance gain using grayscale differences between the first three-color signals, outputting a second luminance component by controlling first luminance component using the interpolated luminance gain.

19 Claims, 8 Drawing Sheets

(58) Field of Classification Search
CPC .............. G09G 2320/0242; G09G 2320/0646; G09G 2320/0666; G09G 2340/06; H04N 1/56–608; H04N 9/64; H04N 9/643; H04N 9/68–77

See application file for complete search history.

(56) References Cited

U.S. PATENT DOCUMENTS

| | | | | |
|---|---|---|---|---|
| 11,223,748 B2* | 1/2022 | Bae | ...................... | H04N 1/6058 |
| 11,587,525 B2* | 2/2023 | Jeon | ...................... | G09G 3/006 |
| 11,640,800 B2* | 5/2023 | Jeon | ...................... | H04N 9/67 |
| | | | | 345/102 |
| 11,670,256 B2* | 6/2023 | Jeon | ...................... | H04N 1/6058 |
| | | | | 345/590 |
| 2005/0248581 A1* | 11/2005 | Choe | ...................... | H04N 1/62 |
| | | | | 345/589 |
| 2005/0271267 A1* | 12/2005 | Cooper | ...................... | H04N 9/646 |
| | | | | 382/167 |
| 2006/0251323 A1* | 11/2006 | MacKinnon | ........... | H04N 9/643 |
| | | | | 348/E9.037 |
| 2007/0070468 A1* | 3/2007 | Ogawa | ................. | H04N 1/6075 |
| | | | | 358/1.9 |
| 2007/0211176 A1* | 9/2007 | Hsu | ......................... | H04N 9/643 |
| | | | | 348/E9.04 |
| 2011/0187735 A1* | 8/2011 | Kondoh | ............... | H04N 1/6058 |
| | | | | 345/589 |
| 2014/0002480 A1* | 1/2014 | Bhaskaran | ................ | G09G 5/02 |
| | | | | 345/590 |
| 2015/0070404 A1* | 3/2015 | Chu Ke | ...................... | G09G 3/3607 |
| | | | | 345/88 |
| 2020/0286210 A1* | 9/2020 | Hsiao | ...................... | G06T 5/008 |

FOREIGN PATENT DOCUMENTS

| | | |
|---|---|---|
| KR | 10-2015-0081153 A | 7/2015 |
| KR | 10-2018-0058363 A | 6/2018 |

* cited by examiner

COLOR GAMUT MAPPING METHOD AND DEVICE

CROSS-REFERENCE TO RELATED APPLICATIONS

This application claims the benefit of the Korean Patent Application No. 10-2020-0146559 filed on Nov. 5, 2020, which are hereby incorporated by reference as if fully set forth herein.

FIELD

The present disclosure relates to a color gamut mapping method and a color gamut mapping device, in which precise color gamut tuning is performed and a contour phenomenon and a color fading phenomenon are prevented, thereby improving color accuracy.

BACKGROUND

As display devices are being developed toward high resolution and high definition, color reproducibility thereof has been improved. Since a color reproduction area that can be expressed by a display device, that is, a color gamut, varies depending on the characteristics of the display device, a color gamut mapping process for compressing a color gamut of an input image according to the characteristics of the display device or for extending the color gamut is required.

For example, when a standard red/green/blue (sRGB) image, which is a standard for high-definition television (HDTV), is displayed on a liquid crystal display device or an organic light-emitting diode display device having a color gamut wider than that of sRGB, a color gamut mapping process for extending the color gamut of the sRGB to the wide color gamut of the corresponding display device is required.

Such a color gamut mapping process requires a color gamut tuning method that is capable of preventing occurrence of a contour phenomenon such as color aggregation in a gray gradation area during luminance tuning or occurrence of color fading while requiring precise color gamut tuning, in order to improve color accuracy.

SUMMARY

The present disclosure is directed to providing to a color gamut mapping method and a color gamut mapping device, in which precise color gamut tuning is performed and a contour phenomenon and a color fading phenomenon are prevented, thereby improving color accuracy.

One aspect of the present disclosure provides a color gamut mapping method including converting, by a color space converter, first three-color signals of an input image into a first luminance component and a pair of first chrominance components and outputting the first luminance component and the pair of first chrominance components, calculating and outputting, by a hue calculator, a hue angle using the first chrominance components, selecting and outputting, by a hue axis selection unit, hue axes of a corresponding control area in which the calculated hue angle is located among a plurality of control areas divided by a plurality of hue axes having different hue angles, calculating and outputting, by a parameter calculator, a plurality of parameters including a plurality of saturation gains and a plurality of hue gains using a plurality of parameters, which are set to correspond to the selected hue axes, and the calculated hue angle, controlling, by a saturation controller, a saturation of the first chrominance component for each control area using the calculated saturation gain and outputting a second chrominance component, controlling, by a hue controller, a hue of the second chrominance component for each control area using the calculated hue gain and outputting a third chrominance component, interpolating, by an overall controller, a set value of a luminance gain using grayscale differences between the first three-color signals and outputting a second luminance component by controlling the first luminance component using the interpolated luminance gain, controlling, by the overall controller, a saturation of the third chrominance component according to brightness values of the first three-color signals and outputting a fourth chrominance component, and inversely converting, by a color space inverse converter, the fourth chrominance component and the second luminance component into second three-color signals and outputting the second three-color signals.

Another aspect of the present disclosure provides a color gamut mapping device including a preprocessor configured to extract and output grayscale differences between first three-color signals of an input image and extract and output brightness values of the first three-color signals, a color space converter configured to convert the first three-color signals supplied from the preprocessor into a first luminance component and a pair of first chrominance components and output the first luminance component and the pair of first chrominance components, a hue calculator configured to calculate and output a hue angle using the first chrominance components, a hue axis selection unit configured to select and output hue axes of a corresponding control area in which the calculated hue angle is located among a plurality of control areas divided by a plurality of hue axes having different hue angles, a parameter calculator configured to calculate and output a plurality of parameters including a plurality of saturation gains and a plurality of hue gains using a plurality of parameters, which are set to correspond to the selected hue axes, and the calculated hue angle, a saturation controller configured to control a saturation of the first chrominance component for each control area using the calculated saturation gains and output a second chrominance component, a hue controller configured to control a hue of the second chrominance component for each control area using the calculated hue gains and output a third chrominance component, an overall controller configured to interpolate a set value of a luminance gain using grayscale differences between the first three-color signals supplied from the preprocessor, output a second luminance component by controlling the first luminance component using the interpolated luminance gain, and output a fourth chrominance component by controlling a saturation of the third chrominance component according to the brightness values supplied from the preprocessor, and a color space inverse converter configured to inversely convert the fourth chrominance component and the second luminance component, which are supplied from the overall controller into second three-color signals, and output the second three-color signals.

The overall controller may entirely control the saturation of the third chrominance component by applying the overall saturation gains to the third chrominance component, entirely control the hue of the third chrominance component whose saturation is entirely controlled by applying the overall hue gains to the third chrominance component whose saturation is entirely controlled, and control the saturation of the third chrominance component according to the brightness values using the third chrominance component whose saturation is entirely controlled as the third chrominance component.

The preprocessor may extract a maximum value from among the first three-color signals as the brightness value and output the maximum value, and the overall controller may control the saturation of the third chrominance component by using the saturation gain set according to the brightness value or by using the saturation gain obtained by interpolating the saturation gain set according to the brightness value.

The hue axis selection unit may select first and second hue axes which are assigned to a corresponding control area in which the calculated hue angle is located among 24 hue axes. The parameter calculator may calculate, in the corresponding control area, first to fourth saturation gains respectively corresponding to first to fourth saturation control areas which are divided by first to third saturation control points having different saturation values and may calculate, in the corresponding control area, first and second hue gains respectively corresponding to first and second hue control areas which are divided by a saturation value of a hue control point.

The saturation controller may control the saturation of the first chrominance component by applying at least one of the first to fourth saturation gains respectively corresponding to the first to fourth saturation control areas to the first chrominance component according to a result of comparing a saturation value of the first chrominance component to the first to third saturation control points.

The hue controller may control the hue of the second chrominance component by applying any one of the first and second hue gains respectively corresponding to the first and second hue control areas to the second chrominance component according to a result of comparing a saturation value of the second chrominance component to the hue control point.

The preprocessor may use the corrected three-color signals obtained by performing white balance correction on three primary color signals of the input image as the first three-color signal, extract a gray area by comparing a maximum value among grayscale differences between the first three-color signals to a gray parameter, and exclude the extracted gray area in a subsequent color gamut mapping process.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
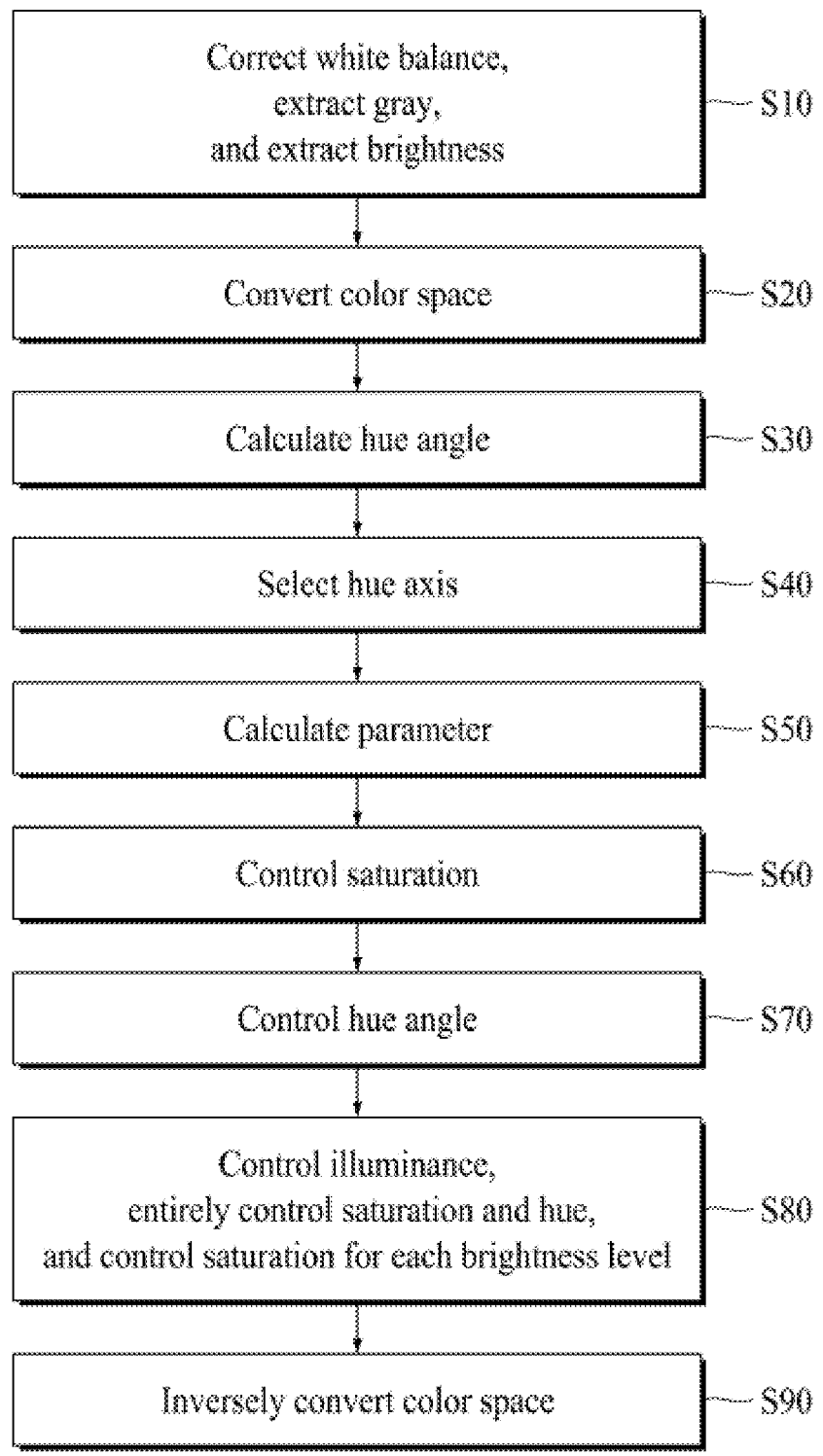
FIG. 1 is a flowchart illustrating a color gamut mapping method according to an embodiment.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case which is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms "first," "second," "A," "B," "(a)," "(b)," etc., may be used. These terms are intended to identify the corresponding elements from the other elements, and basis, order, or number of the corresponding elements should not be limited by these terms. The expression that an element is "connected," "coupled," or "adhered" to another element or layer, the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more among the associated listed elements. For example, the meaning of "at least one or more of a first element, a second element, and a third element" denotes the combination of all elements proposed from two or more of the first element, the second element, and the third element as well as the first element, the second element, or the third element.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

As used herein, the term "unit" refers to software or a hardware component such as a field-programmable gate array (FPGA) or an application-specific integrated circuit (ASIC), and the "unit" performs certain functions. However, the "unit" is not limited to software or hardware. The "unit" may be configured to be stored in a storage medium that may be addressed or may be configured to be executed by one or more processors. Therefore, the "unit" includes, for example, software components, processes, functions, drivers, firmware, circuits, data, database, and tables.

Hereinafter, exemplary embodiments of the present disclosure will be described in detail with reference to the accompanying drawings.

Figure 2:
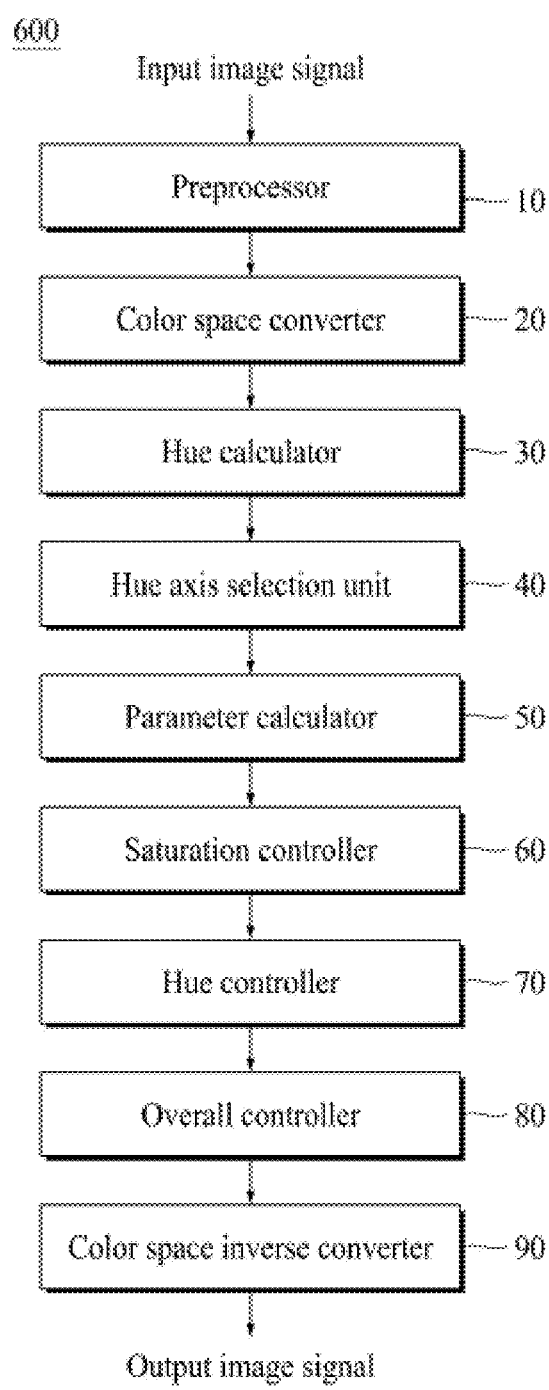
FIG. 2 is a block diagram illustrating a color gamut mapping device according to an embodiment.

FIG. 1 is a flowchart illustrating a color gamut mapping method according to an embodiment of the present disclosure, and FIG. 2 is a block diagram illustrating a color gamut mapping device according to the embodiment of the present disclosure.

The color gamut mapping method illustrated in FIG. 1 may include a preprocessing operation S10, a color space conversion operation S20, a hue angle calculation operation S30, a hue axis selection operation S40, a parameter calculation operation S50, a saturation control operation S60, a hue control operation S70, an overall control operation S80, and a color space inverse conversion operation S90.

A color gamut mapping device 600 illustrated in FIG. 2 may include a preprocessor 10, a color space converter 20, a hue calculator 30, a hue axis selection unit 40, a parameter calculator 50, a saturation controller 60, a hue controller 70, an overall controller 80, and a color space inverse converter 90.

Referring to FIGS. 1 and 2, the preprocessor 10 may perform the preprocessing operation S10 of correcting white balance of an input image, extracting gray areas from the input image, and extracting a brightness value of the input image. Meanwhile, the preprocessor 10 may extract gray areas and a brightness value from an image whose white balance is corrected.

As input image signals, RGB-type image signals (hereinafter, red (R), green (G), and blue (B) signals) respectively representing red, green, and blue image signals may be used.

The preprocessor 10 may first correct the white balance of the input image by applying preset correction gains to the R, G, and B signals of the input image for each color.

The preprocessor 10 may extract the gray areas from the corrected R, G, and B signals and allow the gray areas which are extracted during color gamut mapping processing to be exceptionally processed so that there is no change in luminance, hue, and saturation (S10).

For example, the preprocessor 10 may compare a maximum value max{abs(R−G), abs(R−B), abs(G−B)} among grayscale differences (absolute values) between the corrected R, G, and B signals to a predetermined gray parameter to determine whether the input R, G, and B signals are signals of the gray area. When the maximum value among the grayscale differences between the input R, G, and B signals is smaller than the gray parameter, the preprocessor 10 may extract the corresponding R, G, and B signals as the signals of the gray area. The preprocessor 10 may locate the R, G, and B signals extracted as the signals of the gray area on a basic hue axis Axis0 to prevent the luminance, the hue, and the saturation from being changed during subsequent color gamut mapping processing and prevent occurrence of artifacts due to the change.

The preprocessor 10 may extract the brightness value from the corrected R, G, and B signals. For example, the preprocessor 10 may extract the maximum value among the corrected R, G, and B signals as the brightness value of the input image.

The color space converter 20 may receive the R, G, and B signals from the preprocessor 10 and convert the R, G, and B signals into YCbCr type image signals (hereinafter, Y, Cb, and Cr signals) including a luminance component Y, a chrominance component Cb, and a chrominance component Cr (S20).

For example, the color space converter 20 may convert the R, G, and B signals into the Y, Cb, and Cr signals by using an RGB-to-YCbCr conversion function in which conversion coefficients (in International Telecommunication Union (ITU)-R Recommendation BT.2020) are applied as shown in Equation 1 below. The conversion coefficients applied to Equation 1 below may be changed.

$$Y = 0.2627 \times R + 0.678 \times G + 0.0593 \times B$$

$$Cb = -0.1396 \times R - 0.3603 \times G + 0.5 \times B$$

$$Cr = 0.5 \times R - 0.459 \times G - 0.0402 \times B \quad \text{[Equation 1]}$$

In other words, the color space converter 20 may divide the R, G, and B signals into a luminance signal Y representing luminance information and chrominance signals Cb and Cr representing color information. The color space converter 20 may output the Y, Cb, and Cr signals to the hue calculator 30.

The hue calculator 30 may calculate a hue angle representing a hue value using the chrominance signals Cb and Cr among the image signals Y, Cb, and Cr supplied from the color space converter 20 (S30).

Figure 3:
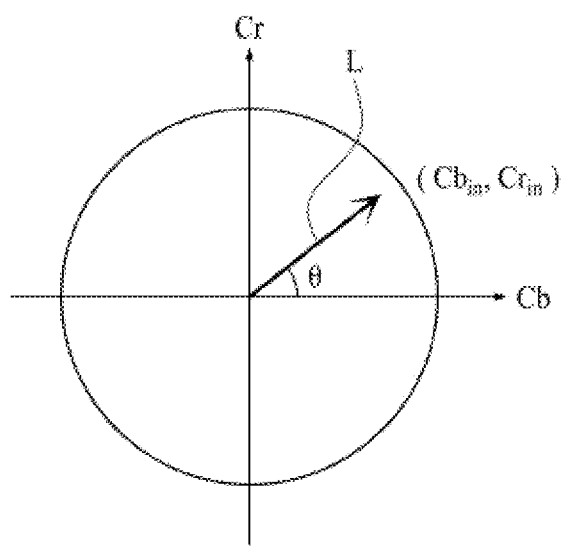
FIG. 3 is a diagram illustrating an example of a hue angle of chrominance components (Cb, Cr) according to an embodiment.

Referring to FIG. 3, a hue angle θ with respect to input Cb and Cr coordinates ($Cb_{in}$, $Cr_{in}$) on a Cb-Cr plane refers to an angle between a Cb axis and a straight line L connecting the corresponding Cb and Cr coordinates ($Cb_{in}$, $Cr_{in}$) from the origin. The hue calculator 30 may calculate the hue angle θ with respect to the input Cb and Cr coordinates ($Cb_{in}$, $Cr_{in}$) using an arc tangent function (a tan) of the Cb and Cr coordinates ($Cb_{in}$, $Cr_{in}$) as shown in Equation 2 below.

$$\text{Hue}(=\theta) = a\tan(Cb\text{in}, Cr\text{in}) \quad \text{[Equation 2]}$$

The hue calculator 30 may output the image signals Y, Cb, and Cr supplied from the color space converter 20 and the calculated hue angle to the hue axis selection unit 40.

The hue axis selection unit 40 may select hue axes of an area in which the hue angle is located using the hue angle supplied from the hue calculator 30 (S40).

Figure 4:
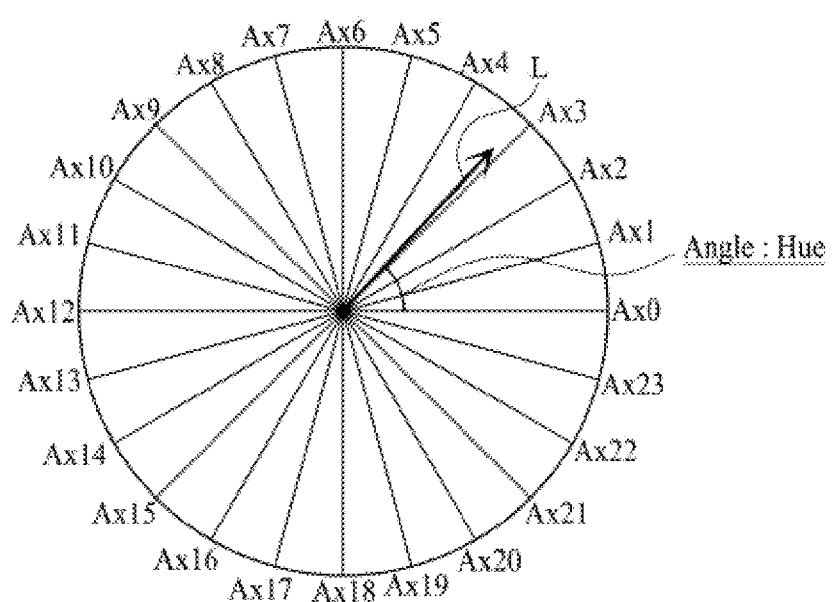
FIG. 4 is a diagram illustrating hue axes in a circular color area according to an embodiment.

For example, 24 hue axes Ax0 to Ax23 located at 15 degree intervals may be assigned in a circular color area on the Cb-Cr plane shown in FIG. 4, and the circular color area may be divided into 24 control areas by the 24 hue axes Ax0 to Ax23.

The hue axis selection unit 40 may select a first hue axis and a second hue axis in an area in which the supplied hue angle is located among the 24 hue axes Ax0 to Ax23. The second hue axis may have a greater hue angle than the first hue axis.

For example, as shown in FIG. 4, when a hue angle calculated by the hue calculator 30, that is, a straight line L of the input Cb, Cr coordinates, is located in an area between a hue axis Ax3 and a hue axis Ax4, the hue axis selection unit 40 may select the hue axis Ax3 and the hue axis Ax4 as the first hue axis and the second hue axis in the corresponding control area, respectively.

The hue axis selection unit 40 may output the image signals Y, Cb, and Cr and the hue angle, which are supplied from the hue calculator 30, and two hue axes, which are selected to correspond to the hue angle, to the parameter calculator 50.

The parameter calculator 50 may calculate a plurality of parameters using the two hue axes supplied from the hue axis selection unit 40 and the hue angle (S50). The parameter calculator 50 may calculate a plurality of parameters using the parameters, which are set to correspond to the two hue axes supplied from the hue axis selection unit 40, and the supplied hue angle.

The parameters calculated by the parameter calculator 50 may include saturation parameters for saturation control and hue parameters for hue control.

The circular color area on the Cb-Cr plane may be divided into a plurality of control areas by a plurality of hue axes according to the hue angle, and the hue and the saturation may be independently adjusted in each control area using the parameters individually assigned to each of the plurality of hue axes. Further, each of the control areas divided by the hue axes may be further divided into a plurality of saturation control areas in order to control the saturation differently according to a saturation value. Furthermore, each of the control areas divided by the hue axes may be further divided into a plurality of hue control areas in order to control the hue differently according to the saturation value.

Figure 5:
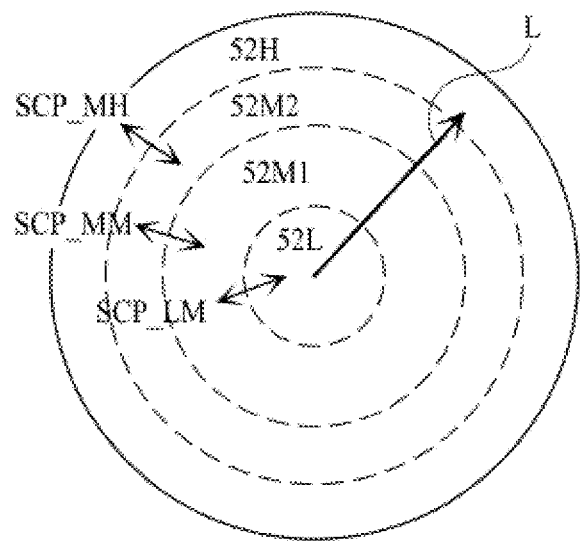
FIG. 5 is a diagram illustrating saturation control areas in a circular color area according to an embodiment.
Figure 6:
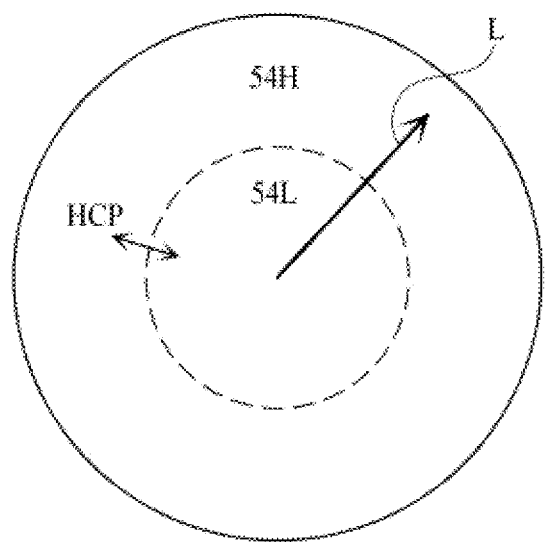
FIG. 6 is a diagram illustrating hue control areas in a circular color area according to an embodiment.

For example, as shown in FIG. 4, the circular color area on the Cb-Cr plane may be divided into 24 control areas by the 24 hue axes Ax0 to Ax23 according to the hue angle. As shown in FIG. 5, each of the control areas may be further divided into first to fourth saturation control areas 52L, 52M1, 52M2, and 52H according to the saturation value corresponding to a length of a straight line L from the origin. Further, as shown in FIG. 6, each of the control areas may be further divided into first and second hue control areas 54L and 54H according to the saturation value.

In a register used by the parameter calculator 50, a first saturation control point SCP_LM, a second saturation control point SCP_MM, a third saturation control point SCP_MH, and a hue control point HCP, which are preset, are stored. The first saturation control point SCP_LM refers to a saturation value that distinguishes a first saturation control area 52L corresponding to a low saturation area from a second saturation control area 52M1 corresponding to a first intermediate saturation area. The second saturation control point SCP_MM refers to a saturation value that distinguishes a second saturation control area 52M1 corresponding to the first intermediate saturation area from a third saturation control area 52M2 corresponding to a second intermediate saturation area whose saturation is greater than the first intermediate saturation area. The third saturation control point SCP_MH refers to a saturation value that distinguishes the third saturation control area 52M2 from a fourth saturation control area 52H corresponding to a high saturation area. The hue control point HCP refers to a saturation value that distinguishes the first hue control area 54L corresponding to a low saturation area for hue control from the second hue control area 54H corresponding to a high saturation area for hue control. The first saturation control point SCP_LM, the second saturation control point SCP_MM, the third saturation control point SCP_MH, and the hue control point HCP may be adjustable by a designer according to display characteristics.

The parameters, which are each set to correspond to one hue axis and are stored in registers, may include a first saturation parameter corresponding to the first saturation control area 52L, a second saturation parameter corresponding to the second saturation control area 52M1, a third saturation parameter corresponding to the third saturation control area 52M2, a fourth saturation parameter corresponding to the fourth saturation control area 52H, a first hue parameter corresponding to the first hue control area 54L, and a second hue parameter corresponding to the second hue control area 54H.

Figure 7:
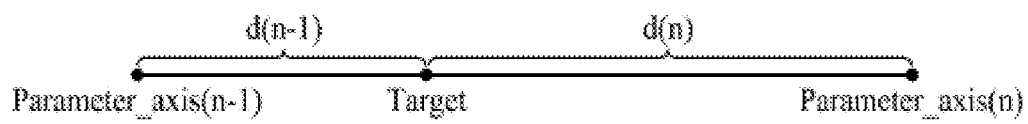
FIG. 7 is a diagram for describing a method of calculating parameters which is performed by a parameter calculator according to an embodiment.

Referring to FIG. 7, the parameter calculator 50 may linearly interpolate a parameter Parameter_axis(n−1) of a first hue axis Ax(n−1) (n is a positive integer) and a parameter Parameter_axis(n) of a second hue axis Ax(n) using angle differences d(n−1) and d(n) between a supplied hue angle Target and a corresponding hue axis as shown in Equation 3 below to calculate a linearly interpolated parameter Parameter_result as a gain for controlling the saturation and hue of the supplied Cb and Cr signals.

$$\text{Parameter\_result} = d(n-1) \times \text{Parameter\_axis}(n) + d(n) \times \text{Parameter\_axis}(n-1) \quad \text{[Equation 3]}$$

In Equation 3 above, Parameter_axis(n−1) denotes the parameter set to the first hue axis Ax(n−1) and Parameter_axis(n) denotes the parameter set to the second hue axis Ax(n). d(n−1) denotes an angle difference between the supplied hue angle Target and the first hue axis Ax(n−1) and d(n) denotes an angle difference between the second hue axis Ax(n) and the supplied hue angle Target. The parameters of each hue axis may include a saturation parameter and a hue parameter.

For example, the parameter calculator 50 may linearly interpolate a first saturation parameter set to the first hue axis Ax(n−1) and a first saturation parameter set to the second hue axis Ax(n) as shown in Equation 3 above to calculate a first saturation gain to be applied to the supplied Cb and Cr signals. The parameter calculator 50 may linearly interpolate a second saturation parameter set to the first hue axis Ax(n−1) and a second saturation parameter set to the second hue axis Ax(n) as shown in Equation 3 above to calculate a second saturation gain to be applied to the supplied Cb and Cr signals. The parameter calculator 50 may linearly interpolate a third saturation parameter set to the first hue axis Ax(n−1) and a third saturation parameter set to the second hue axis Ax(n) as shown in Equation 3 above to calculate a third saturation gain to be applied to the supplied Cb and Cr signals. The parameter calculator 50 may linearly interpolate a fourth saturation parameter set to the first hue axis Ax(n−1) and a fourth saturation parameter set to the second hue axis Ax(n) as shown in Equation 3 above to calculate a fourth saturation gain to be applied to the supplied Cb and Cr signals.

The parameter calculator 50 may linearly interpolate a first hue parameter set to the first hue axis Ax(n−1) and a first hue parameter set to the second hue axis Ax(n) as shown in Equation 3 above to calculate a first hue gain to be applied to the supplied Cb and Cr signals. The parameter calculator 50 may linearly interpolate a second hue parameter set to the first hue axis Ax(n−1) and a second hue parameter set to the second hue axis Ax(n) as shown in Equation 3 above to calculate a second hue gain to be applied to the supplied Cb and Cr signals.

The parameter calculator 50 may output the image signals Y, Cb, and Cr, which are supplied from the hue axis selection unit 40, and the first to fourth saturation gains and the first and second hue gains, which are calculated by the parameter calculator 50, to the saturation controller 60.

The saturation controller 60 may control the saturation of the chrominance signals Cb and Cr supplied from the parameter calculator 50 using at least one of the first to fourth saturation gains calculated by the parameter calculator 50 (S60). The saturation controller 60 may determine a saturation control area, in which the supplied chrominance signals Cb and Cr are located, and apply the corresponding saturation gain for each saturation control area according to the determined saturation control area to control the saturation of the supplied chrominance signals Cb and Cr.

The saturation controller 60 calculates a saturation value Sat of the supplied chrominance signals Cb and Cr, that is, a saturation value Sat corresponding to a length of a straight line to the coordinates of the chrominance signals Cb and Cr from the origin, as shown in Equation 4 below.

$$Sat = \sqrt{Cb^2 + Cr^2} \quad \text{[Equation 4]}$$

The saturation controller 60 may determine which area the chrominance signals Cb and Cr are located in among the first to fourth saturation control areas, by comparing the saturation value of the chrominance signals Cb and Cr to the first to third saturation control points SCP_LM, SCP_MM, and SCP_MH and may adjust the saturation of the supplied chrominance signals Cb and Cr by applying the corresponding saturation gain among the first to fourth saturation gains to the determined saturation control area.

The saturation controller 60 may control the saturation of the supplied chrominance signals Cb and Cr by respectively applying different first to fourth saturation gains to the saturation of the supplied chrominance signals Cb and Cr according to the first to fourth saturation control areas 52L, 52M1, 52M2, and 52H (see FIG. 5) divided by the first to third saturation control points SCP_LM, SCP_MM, and SCP_MH.

When the saturation value of the supplied chrominance signals Cb and Cr is less than or equal to the first saturation control point SCP_LM, the saturation controller 60 may determine that the chrominance signals Cb and Cr are located in the first saturation control area 52L (see FIG. 5) and may control the saturation of the supplied chrominance signals Cb and Cr by applying (multiplying) the first saturation gain of the first saturation control area 52L to (and) the supplied chrominance signals Cb and Cr.

When the saturation value of the supplied chrominance signals Cb and Cr is greater than the first saturation control point SCP_LM and is less than or equal to the second saturation control point SCP_MM, the saturation controller 60 may determine that the chrominance signals Cb and Cr are located in the second saturation control area 52M1 (see FIG. 5) and may control the saturation of the supplied chrominance signals Cb and Cr by summing a value obtained by applying (multiplying) the first saturation gain of the first saturation control area 52L to (and) the supplied chrominance signals Cb and Cr for each saturation control area and a value obtained by applying (multiplying) the second saturation gain of the second saturation control area 52M1 to (and) the supplied chrominance signals Cb and Cr for each saturation control area.

For example, the saturation controller 60 may divide the saturation value Sat of the chrominance signals Cb and Cr located in the second saturation control area 52M1 (see FIG. 5) into a first saturation value SCP_LM of the first saturation control area 52L and a second saturation value (Sat−SCP_LM) of the second saturation control area 52M1.

The saturation controller 60 may precisely control and output the saturation of the chrominance signals Cb and Cr for each saturation control area by summing a value obtained by applying (multiplying) the first saturation gain of the first saturation control area 52L to (and) the first saturation value SCP_LM of the first saturation control area 52L and a value obtained by applying (multiplying) the second saturation gain of the second saturation control area 52M1 to (and) the second saturation value (Sat−SCP_LM) of the second saturation control area 52M1.

When the saturation value of the supplied chrominance signals Cb and Cr is greater than the second saturation control point SCP_MM and is less than or equal to the third saturation control point SCP_MH, the saturation controller 60 may determine that the chrominance signals Cb and Cr are located in the third saturation control area 52M2 (see FIG. 5) and may control the saturation of the supplied chrominance signals Cb and Cr for each saturation control area by summing a value obtained by applying (multiplying) the first saturation gain of the first saturation control area 52L to (and) the supplied chrominance signals Cb and Cr, a value obtained by applying (multiplying) the second saturation gain of the second saturation control area 52M1 to (and) the supplied chrominance signals Cb and Cr, and a value obtained by applying (multiplying) the third saturation gain of the third saturation control area 52M2 to (and) the supplied chrominance signals Cb and Cr.

The saturation controller 60 may divide the saturation value Sat of the chrominance signals Cb and Cr located in the third saturation control area 52M2 into a first saturation value SCP_LM of the first saturation control area 52L, a second saturation value (SCP_MM−SCP_LM) of the second saturation control area 52M1, and a third saturation value (Sat−SCP_MM) of the third saturation control area 52 M2.

The saturation controller 60 may precisely control and output the saturation of the chrominance signals Cb and Cr for each saturation control area by summing all of the value obtained by applying (multiplying) the first saturation gain of the first saturation control area 52L to (and) the first saturation value SCP_LM of the first saturation control area 52L, the value obtained by applying (multiplying) the second saturation gain of the second saturation control area 52M1 to (and) the second saturation value (SCP_MM−SCP_LM) of the second saturation control area 52M, and the value obtained by applying (multiplying) the third saturation gain of the third saturation control area 52M2 to (and) the third saturation value (Sat−SCP_MM) of the third saturation control area 52M2.

When the saturation value of the supplied chrominance signals Cb and Cr is greater than the third saturation control point SCP_MH, the saturation controller 60 may determine that the chrominance signals Cb and Cr are located in the fourth saturation control area 52H (see FIG. 5) and may control the saturation of the supplied chrominance signals Cb and Cr for each saturation control area by summing a value obtained by applying (multiplying) the first saturation gain of the first saturation control area 52L to (and) the supplied chrominance signals Cb and Cr, a value obtained by applying (multiplying) the second saturation gain of the second saturation control area 52M1 to (and) the supplied chrominance signals Cb and Cr, a value obtained by applying (multiplying) the third saturation gain of the third saturation control area 52M2 to (and) the supplied chrominance signals Cb and Cr, and a value obtained by applying (multiplying) the fourth saturation gain of the fourth saturation control area 52H to (and) the supplied chrominance signals Cb and Cr.

The saturation controller 60 may divide the saturation value Sat of the chrominance signals Cb and Cr located in the fourth saturation control area 52H into a first saturation value (SCP_LM) of the first saturation control area 52L, a second saturation value (SCP_MM−SCP_LM) of the second saturation control area 52M1, a third saturation value (SCP_MH−SCP_MM) of the third saturation control area 52M2, and a fourth saturation value (Sat−SCP_MH) of the fourth saturation control area 52H.

The saturation controller 60 may precisely control and output the saturation of the chrominance signals Cb and Cr for each saturation control area by summing all of the value obtained by applying (multiplying) the first saturation gain of the first saturation control area 52L to (and) the first saturation value (SCP_LM) of the first saturation control area 52L, the value obtained by applying (multiplying) the second saturation gain of the second saturation control area 52M1 to (and) the second saturation value (SCP_MM−SCP_LM) of the second saturation control area 52M1, the value obtained by applying (multiplying) the third saturation gain of the third saturation control area 52M2 to (and) the third saturation value (SCP_MH−SCP_MM) of the third saturation control area 52M2, and the value obtained by applying (multiplying) the fourth saturation gain of the fourth saturation control area 52H to (and) the fourth saturation value (Sat−SCP_MH) of the fourth saturation control area 52H.

The saturation controller 60 may output the Y signal and the first and second hue gains, which are supplied from the parameter calculator 50, the Cb and Cr signals whose saturation is adjusted by the saturation controller 60 in the corresponding control area, and the saturation value, which is calculated by the saturation controller 60, to the hue controller 70.

The hue controller 70 may control the hue of the Cb and Cr signals supplied from the saturation controller 60 using any one of the first and second hue gains according to the saturation value supplied from the saturation controller 60 (S70).

The hue controller 70 may determine the hue control area by comparing the saturation value supplied from the saturation controller 60 to the hue control point HCP and may control the hue of the Cb and Cr signals supplied from the saturation controller 60 by applying the hue gain of the determined hue control area to the Cb and Cr signals supplied from the saturation controller 60.

For example, when the saturation value supplied from the saturation controller 60 is less than or equal to the hue control point HCP, the hue controller 70 may determine that the chrominance signals Cb and Cr are located in the first hue control area 54L (see FIG. 6), may select a first hue gain of the first hue control area 54L supplied from the saturation controller 60, and adjust the hue of the Cb and Cr signals by applying the selected first hue gain to the Cb and Cr signals supplied from the saturation controller 60.

When the saturation value supplied from the saturation controller 60 is greater than the hue control point HCP, the hue controller 70 may determine that the chrominance signals Cb and Cr are located in the second hue control area 54H (see FIG. 6), may select a second hue gain of the second hue control area 54H supplied from the saturation controller 60, and adjust the hue of the Cb and Cr signals by applying the selected second hue gain to the Cb and Cr signals supplied from the saturation controller 60.

Figure 8:
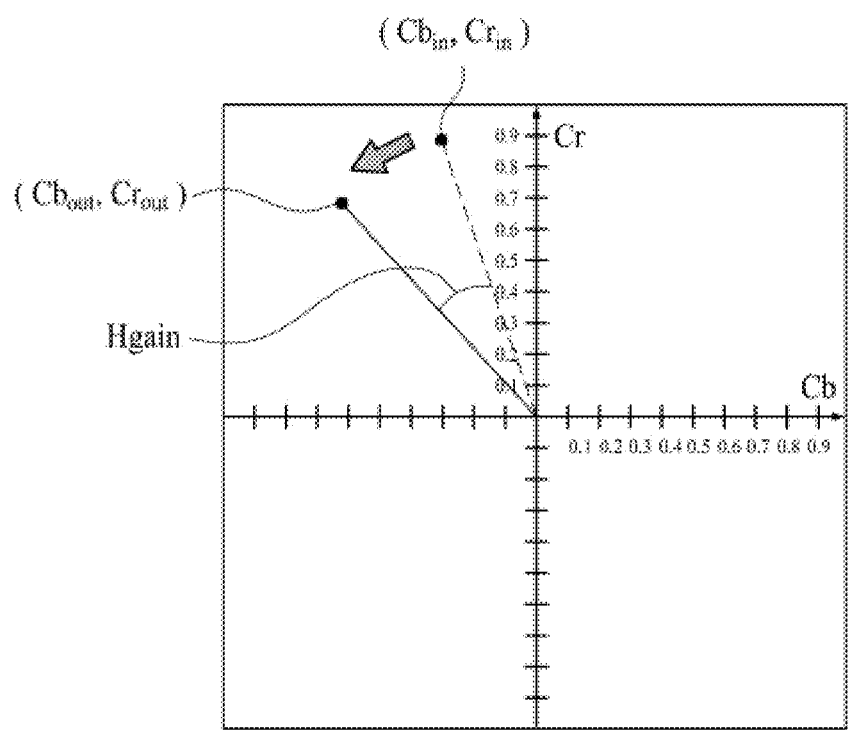
FIG. 8 is a diagram illustrating a method of controlling a hue according to an embodiment.

Referring to FIG. 8, the hue controller 70 may rotate supplied Cb and Cr signals $Cb_{in}$ and $Cr_{in}$ by a hue control gain $H_{gain}$ by applying the hue control gain $H_{gain}$ selected according to the supplied saturation value and may output Cb and Cr signals $Cb_{out}$ and $Cr_{out}$ whose hue is controlled. The hue controller 70 may apply the hue control gain $H_{gain}$ selected according to the supplied saturation value to the Cb and Cr signals $Cb_{in}$ and $Cr_{in}$ supplied from the saturation controller 60 with a cosine function and a sine function as shown in Equation 5 below and may output the Cb and Cr signals $Cb_{out}$ and $Cr_{out}$ whose hue is controlled.

$$Cb_{out} = Cb_{in} \times \cos(H_{gain}) + Cr_{in} \times \sin(H_{gain})$$

$$Cr_{out} = -Cb_{in} \times \sin(H_{gain}) + Cr_{in} \times \cos(H_{gain}) \qquad \text{[Equation 5]}$$

The hue controller 70 may output the Y signal supplied from the saturation controller 60 and the Cb and Cr signals whose saturation and hue are adjusted in the corresponding control area by the saturation controller 60 and the hue controller 70 to the overall controller 80.

The overall controller 80 may control the luminance of the Y signal supplied from the hue controller 70 (S80). The overall controller 80 may entirely control the saturation and hue of the Cb and Cr signals supplied from the hue controller 70 without dividing the control area (S80). The overall controller 80 may additionally control the entirely controlled saturation of the Cb and Cr signals according to the brightness value of the image signal supplied from the preprocessor 10 (S80).

The overall controller 80 may correct the R, G, and B signals by interpolating a preset luminance gain Yset in the register as shown in Equation 6 below according to the maximum value max{abs(R−G), abs(R−B), abs(G−B)} among the grayscale differences between the R, G, and B signals supplied from the preprocessor 10.

$$Ygain_{out} = 128 + input_x \times \frac{Yset - 128}{256} \qquad \text{[Equation 6]}$$

In Equation 6 above, input denotes the maximum value max{abs(R−G), abs(R−B), abs(G−B)} among the grayscale differences between the R, G, and B signals supplied from the preprocessor 10 and corresponds to an input value corresponding to an X-axis of a luminance gain Ygain graph illustrated in FIG. 8. Yset denotes the luminance gain set in the register. $Ygain_{out}$ denotes the interpolated luminance gain and denotes an output luminance gain corresponding to a Y-axis of a graph illustrated in FIG. 9.

Figure 9:
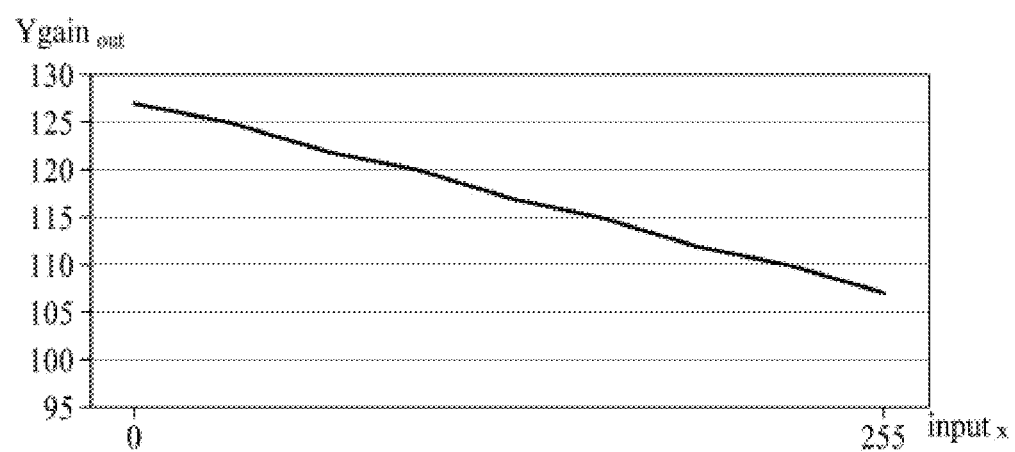
FIG. 9 is a graph showing an interpolation result of a luminance gain according to an embodiment.

Referring to FIG. 9, it can be seen that, as the input value of the X-axis corresponding to the maximum value input max{abs(R−G), abs(R−B), abs(G−B)} among the grayscale differences between the R, G, and B signals increases, that is, as the maximum value among the grayscale differences increases from gray (0), in which all of the R, G, and B signals are identical to each other, to 255, the luminance gain $Ygain_{out}$ interpolated according to Equation 6 above is gradually reduced from a maximum value, 127, of the luminance gain to a minimum value, 107, of the luminance gain, which is the value set in the register.

The overall controller 80 may control the Y signal by applying the interpolated luminance gain $Ygain_{out}$ to the Y signal supplied from the hue controller 70.

Accordingly, it is possible to express the luminance, such as a gradation in the gray area, reduce a luminance step between the gray area and other grayscale areas, and prevent a contour phenomenon, such as color aggregation in the gray area, thereby improving color accuracy.

In order to entirely control the saturation and hue of the Cb and Cr signals supplied from the hue controller 70, the overall parameters that may entirely control all the control areas, that is, the overall saturation gains that may entirely control the saturation of all the control areas and the overall hue gains that may entirely control the hue of all the control areas, are preset and stored in the register.

The overall controller 80 may entirely control the saturation once more by applying (multiplying) the overall saturation gains to (and) the Cb and Cr signals supplied from the hue controller 70. The overall controller 80 may entirely control the hue once more by applying the overall hue gains to the Cb and Cr signals whose saturation is controlled by applying the overall saturation gains, as shown in Equation 5 above.

The overall controller 80 may additionally control the entirely controlled saturation of the Cb and Cr signals according to the brightness value of the image signals R, G, and B supplied from the preprocessor 10, that is, according to the brightness value using the maximum value among the grayscale differences between the R, G, and B signals.

In order to control the saturation according to the brightness value, saturation gains corresponding to a plurality of brightness values may be preset and stored in the register. For example, the saturation gains corresponding to brightness values of 0%, 25%, 50%, 75%, and 100% may be set and stored in the register.

The overall controller 80 may calculate the saturation gain corresponding to the brightness value which is not set in the register by interpolating the saturation gain set using the maximum value among the grayscale differences between the R, G, and B signals.

The overall controller 80 may further control the saturation of the Cb and Cr signals according to the brightness of the input image signal by applying the saturation gain according to the brightness value which is set in the register or calculated by the interpolation process to the Cb and Cr signals whose saturation is entirely controlled. Accordingly, it is possible to prevent color fading that occurs when color gamut tuning is performed based on the brightness value of 100%, thereby improving color accuracy.

The overall controller 80 may output the Y signal whose luminance is adjusted by the overall controller 80 and the Cb and Cr signals whose saturation and hue are entirely and further adjusted by the overall controller 80 to the color space inverse converter 90.

The color space inverse converter 90 may inversely convert the Y, Cb, and Cr signals supplied from the overall controller 80 into R, G, and B signals and may output the converted R, G, B signals (S90).

For example, the color space inverse converter 90 may inversely convert the Y, Cb, and Cr signals into R', G', and B' signals by using a YCbCr-to-RGB conversion function in which conversion coefficients (in BT.2020) are applied as shown in Equation 7 below. The conversion coefficients applied to Equation 7 below may be changed.

$$R=Y+1.4746 \times Cr$$

$$G=Y-0.1645 \times Cb-0.5714 \times Cr$$

$$B=Y+1.8814 \times Cb \quad \text{[Equation 7]}$$

As described above, in the color gamut mapping method and the color gamut mapping device 600 according to the embodiment, the input image signals may be divided into the luminance component Y and the chrominance components Cb and Cr, and the image signals mapped to the target color gamut of the corresponding display device may be output by controlling the luminance component Y and controlling the saturation and hue of the chrominance components Cb and Cr.

In the color gamut mapping method and the color gamut mapping device 600 according to the embodiment, the control area may be divided into 24 control areas by 24 hue axes, and the hue and the saturation may be independently adjusted in each control area using the parameters individually assigned to each of the 24 hue axes.

In the color gamut mapping method and the color gamut mapping device 600 according to the embodiment, each of the control areas divided by the hue axes may be further divided into four saturation control areas having different saturation gains according to the saturation value, the saturation may be precisely controlled for each saturation control area, and thus the accuracy of saturation tuning can be improved.

In the color gamut mapping method and the color gamut mapping device 600 according to the embodiment, each of the control areas divided by the hue axes may be further divided into two hue control areas having different hue gains according to the saturation value, the hue may be precisely controlled for each hue control area, and thus the accuracy of saturation tuning can be improved.

In the color gamut mapping method and the color gamut mapping device 600 according to the embodiment, by entirely controlling the chrominance components Cb and Cr whose saturation and hue are once more controlled for each control area without dividing the area by applying the overall saturation gains and the overall hue gains, the accuracy of color gamut mapping may be further improved by reducing an error range of the color gamut mapping, and a color gamut mapping time may be reduced as compared to the case of additional control for each control area, and a minimum number of control signals may be used, and thus the color gamut mapping may be efficiently processed.

In the color gamut mapping method and the color gamut mapping device 600 according to the embodiment, it is possible to interpolate the set luminance gain according to the maximum value among the grayscale differences between the input image signals R, G, and B, and control the luminance signal Y by applying the interpolated luminance gain to the luminance signal Y. Therefore, it is possible to express gray gradations, reduce the luminance step between gray levels, and prevent contour phenomena such as color aggregation in gray areas, thereby improving color accuracy.

In the color gamut mapping method and the color gamut mapping device 600 according to the embodiment, by further controlling the entirely controlled saturation of the chrominance signals Cb and Cr according to the brightness of the input image signal, it is possible to prevent color fading and improve color accuracy.

Figure 10A:
FIGS. 10A, 10B and 10C are diagrams showing contour improvement effects of gray areas using a color gamut mapping method according to an embodiment.
Figure 10B:
Figure 10C:

FIGS. 10A to 10C are diagrams showing contour improvement effects of gray areas using a color gamut mapping method according to an embodiment.

Referring to FIGS. 10A to 10C, it can be seen that, in comparison to an input image (see FIG. 10A) having a relatively low overall luminance, in an output image (see FIG. 10B) in which a color gamut is tuned by applying a set luminance gain in the related art, there is a problem in that color aggregation occurs in a gray gradation area of a sky part, whereas, in an output image (see FIG. 10C) in which a color gamut is tuned by applying an interpolated luminance gain according to grayscale differences between input image signals R, G, and B according to the embodiment, a color aggregation phenomenon is improved so that the gray gradation area of the sky part is expressed and color accuracy is improved.

The color gamut mapping device 600 according to the embodiment may be applied to a display device, and thus the color accuracy of the display device can be improved.

Figure 11:
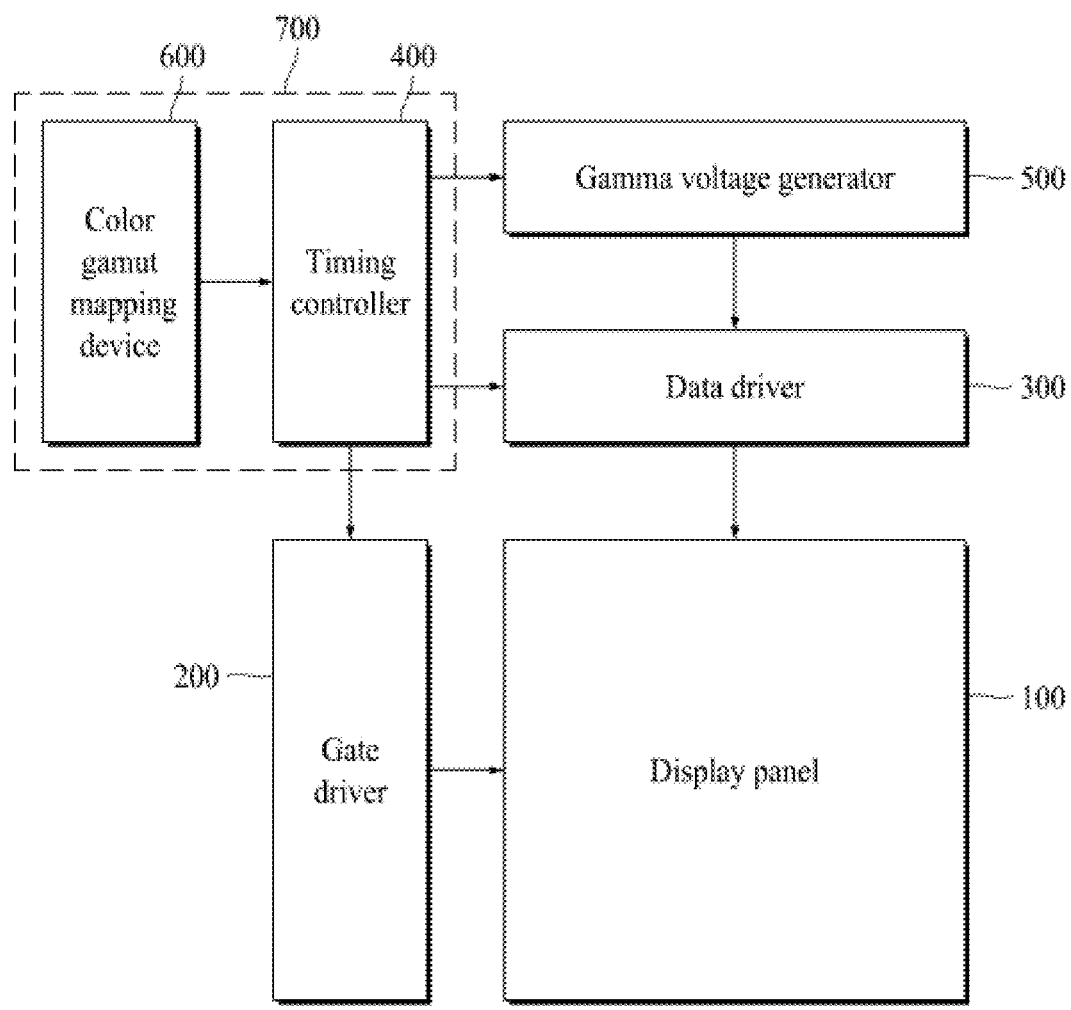
FIG. 11 is a block diagram illustrating a display device having a color gamut mapping device according to an embodiment.

FIG. 11 is a block diagram schematically illustrating a configuration of a display device to which the color gamut mapping device 600 according to the embodiment is applied.

The display device according to the embodiment may be any one of various display devices including a liquid crystal display device, an electroluminescent display device, a micro light-emitting diode (LED) display device, and the like. The electroluminescent display device may be an organic light-emitting diode (OLED) display device, a quantum dot light-emitting diode display device, or an inorganic light-emitting diode display device.

Referring to FIG. 11, the display device may include a display panel 100, a gate driver 200, a data driver 300, a gamma voltage generator 500, a timing controller 400, a color gamut mapping device 600, and the like. The color gamut mapping device 600 and the timing controller 400 may be defined as an image processor 700. The color gamut mapping device 600 may be built in the timing controller 400. The gate driver 200 and the data driver 300 may be defined as a panel driving unit. The gate driver 200, the data driver 300, and the timing controller 400 may be defined as a display driving unit.

As described above, when the hue and saturation of the input image are controlled, the color gamut mapping device 600 may divide the control area into 24 control areas by 24 hue axes and may precisely and independently adjust the hue and the saturation in each control area using the parameters individually assigned to each of the 24 hue axes. In this case, each of the control areas may be further divided into four saturation control areas having different saturation gains according to the saturation value so that the saturation may be precisely controlled for each saturation control area, and each of the control areas may be further divided into two hue control areas having different hue gains according to the saturation value so that the hue may be precisely controlled for each hue control area.

The color gamut mapping device 600 may entirely and further control the chrominance components Cb and Cr whose saturation and hue are controlled for each control area by applying the overall saturation gains and the overall hue gains, and thus an error range of the color gamut mapping may be reduced. The color gamut mapping device 600 may control the luminance signal Y by applying the interpolated luminance gain according to the maximum value among the grayscale differences between the input image signals R, G, and B, and thus gray gradation may be expressed and color aggregation may be prevented. The color gamut mapping device 600 may further control the entirely controlled saturation of the chrominance signals Cb and Cr according to the brightness of the input image signal, and thus color fading may be prevented.

The color gamut mapping device 600 may output the output image that is more accurately mapped to the target color gamut of the display device and has improved color accuracy to the timing controller 400.

The timing controller 400 may perform various types of post-processing on image data supplied from the color gamut mapping device 600, such as luminance correction or image quality correction for reducing power consumption, and may supply the post-processed image data to the data driver 300.

The timing controller 400 may receive synchronization signals together with the image data through the color gamut mapping device 600. The synchronization signals may include a dot clock, a data enable signal, a vertical synchronization signal, a horizontal synchronization signal, and the like. The timing controller 400 may generate and supply a plurality of data control signals using the supplied synchronization signals and timing setup information (start timing, the pulse width, etc.) stored therein to the data driver 300 and may generate and supply a plurality of gate control signals to the gate driver 200.

The gamma voltage generator 500 may generate and supply a reference gamma voltage set including a plurality of reference gamma voltages having different voltage levels to the data driver 300. The gamma voltage generator 500 may generate and supply a plurality of reference gamma voltages corresponding to the gamma characteristics of the display device to the data driver 300 under the control of the timing controller 400. The gamma voltage generator 500 may be configured as a programmable gamma integrated chip (IC), and the gamma voltage generator 500 may receive gamma data from the timing controller 400, generate or adjust a reference gamma voltage level according to the gamma data, and output the reference gamma voltage level to the data driver 300.

The data driver 300 is controlled according to the data control signal supplied from the timing controller 400, and the data driver 300 converts digital image data supplied from the timing controller 400 into analog data signals and supplies a corresponding data signal to each of the data lines of the display panel 100. The data driver 300 may convert the digital image data into the analog data signal using grayscale voltages in which the plurality of reference gamma voltages supplied from the gamma voltage generator 500 are subdivided.

The gate driver 200 may be controlled according to the plurality of gate control signals supplied from the timing controller 400 and may individually drive the gate lines of the display panel 100. The gate driver 200 may sequentially drive the plurality of gate lines. The gate driver 200 may supply a scan signal of a gate-on voltage to a corresponding gate line during a driving period of each gate line and may supply a gate-off voltage to the corresponding gate line during a non-driving period of each gate line.

The display panel 100 displays an image through a display area in which subpixels are arranged in a matrix form. Each subpixel is any one of an R subpixel emitting red light, a G subpixel emitting green light, a B subpixel emitting blue light, and a white (W) subpixel emitting white light and is independently driven by at least one thin-film transistor (TFT). A unit pixel may be composed of a combination of two, three, or four subpixels having different colors.

The display panel 100 may further include a touch sensor screen that senses a user's touch by entirely overlapping a display area, and the touch sensor screen may be embedded in the display panel 100 or disposed on the display area of the display panel 100.

The color gamut mapping device and the display device including the same according to the embodiment may be applied to various electronic devices. For example, the color gamut mapping device and the display device including the same according to the embodiment may be applied to a mobile device, a video phone, a smart watch, a watch phone, a wearable device, a foldable device, a rollable device, a bendable device, a flexible device, a curved device, an electronic notebook, an e-book, a portable multimedia player (PMP), a personal digital assistant (PDA), an MPEG audio layer-3 player, a mobile medical device, a desktop personal computer (PC), a laptop PC, a netbook computer, a workstation, a navigation device, a vehicle navigation device, a vehicle display device, a television, a wallpaper display device, a signage device, a game device, a notebook computer, a monitor, a camera, a camcorder, a home appliance, and the like.

The color gamut mapping device according to the embodiment may be implemented in the form of an IC. A function of the color gamut mapping device according to the embodiment may be implemented in the form of a program and mounted in an IC. The function of the color gamut mapping device according to the embodiment may be implemented as a program, functions of the components included in the color gamut mapping device may be implemented as a specific code, and code for implementing a specific function may be implemented as one program or may be implemented by being divided into a plurality of programs.

Features, structures, effects, etc. described above in various examples of the present disclosure are included in at least one example of the present disclosure and are not necessarily limited to only one example. Furthermore, features, structures, effects, etc. illustrated in at least one example of the present disclosure may be combined or modified for other examples by those skilled in the art to which the technical idea of the present disclosure pertains. Therefore, the contents related to such combinations and modifications should be interpreted as being included in the technical spirit or scope of the present disclosure.

While the present disclosure described above is not limited to the above-described embodiments and the accompanying drawings, it will be apparent to those skilled in the art to which the present disclosure belongs that various substitutions, modifications, and changes may be made herein without departing from the scope of the present disclosure. Therefore, the scope of the present disclosure is defined by the appended claims, and all changes or modifications derived from the meaning, scope, and equivalence of the claims are to be construed as being included in the scope of the present disclosure.

What is claimed is:

1. A color gamut mapping method comprising:
    converting, by a color space converter, first three-color signals of an input image into a first luminance component and a pair of first chrominance components and outputting the first luminance component and the pair of first chrominance components;
    calculating and outputting, by a hue calculator, a hue angle using the first chrominance components;
    selecting and outputting, by a hue axis selection unit, hue axes of a corresponding control area in which the calculated hue angle is located among a plurality of control areas divided by a plurality of hue axes having different hue angles;
    calculating and outputting, by a parameter calculator, a plurality of parameters including a plurality of saturation gains and a plurality of hue gains using a plurality of parameters, which are set to correspond to the selected hue axes, and the calculated hue angle;
    controlling, by a saturation controller, a saturation of the first chrominance component for each control area using the calculated saturation gain and outputting a second chrominance component;
    controlling, by a hue controller, a hue of the second chrominance component for each control area using the calculated hue gain and outputting a third chrominance component;
    interpolating, by an overall controller, a set value of a luminance gain using grayscale differences between the first three-color signals and outputting a second luminance component by controlling the first luminance component using the interpolated luminance gain;
    controlling, by the overall controller, a saturation of the third chrominance component according to brightness values of the first three-color signals and outputting a fourth chrominance component; and
    inversely converting, by a color space inverse converter, the fourth chrominance component and the second luminance component into second three-color signals and outputting the second three-color signals.

2. The color gamut mapping method of claim 1, further comprising:
    before the outputting, by the overall controller, of the fourth chrominance component,
    entirely controlling, by the overall controller, the saturation of the third chrominance component by applying the overall saturation gains to the third chrominance component; and
    entirely controlling, by the overall controller, a hue of the third chrominance component whose saturation is entirely controlled by applying the overall hue gains to the third chrominance component whose saturation is entirely controlled,
    wherein the overall controller controls the saturation of the third chrominance component according to the brightness values using the third chrominance component in which the saturation and the hue are entirely controlled as the third chrominance component.

3. The color gamut mapping method of claim 1, wherein the overall controller interpolates the set value of the luminance gain using a function below, $$Ygain_{out} = 128 + input_x \times \frac{Yset - 128}{256}$$

in the above function, input$_x$ denotes a maximum value max{abs(R−G), abs(R−B), abs(G−B)} among grayscale differences between the first three-color signals (R, G, and B), Yset denotes the set value of the luminance gain, and Ygain$_{out}$ denotes the interpolated luminance gain.

4. The color gamut mapping method of claim 1, wherein:

the preprocessor extracts a maximum value from among the first three-color signals as the brightness value and outputs the maximum value; and the overall controller controls the saturation of the third chrominance component by using the saturation gain set according to the brightness value or by using the saturation gain obtained by interpolating the saturation gain set according to the brightness value.

5. The color gamut mapping method of claim 1, wherein:

the selecting, by the hue axis selection unit, of the hue axes includes selecting and outputting a first hue axis and a second hue axis which are assigned to a corresponding control area in which the calculated hue angle is located among 24 hue axes; and the calculating, by the parameter calculator, of the parameters includes, in the corresponding control area, calculating a first saturation gain, a second saturation gain, a third saturation gain, and a fourth saturation gain respectively corresponding to a first saturation control area, a second saturation control area, a third saturation control area, and a fourth saturation control area which are divided by a first saturation control point, a second saturation control point, and a third saturation control point having different saturation values, and in the corresponding control area, calculating a first hue gain and a second hue gain respectively corresponding to a first hue control area and a second hue control area which are divided by a saturation value of a hue control point.

6. The color gamut mapping method of claim 5, wherein the parameter calculator is configured to:

calculate the first to fourth saturation gains by linearly interpolating first to fourth saturation parameters of the first hue axis, which are set for each of the first to fourth saturation control areas to correspond to the first hue axis, and the first to fourth saturation parameters of the second hue axis, which are set for each of the first to fourth saturation control areas to correspond to the second hue axis, for each of the first to fourth saturation control areas according to the calculated hue angle; and calculate the first and second hue gains by linearly interpolating first and second hue parameters of the first hue axis, which are set for each of the first and second hue control areas to correspond to the first hue axis, and the first and second hue parameters of the second hue axis, which are set for each of the first and second hue control areas to correspond to the second hue axis, for each of first and second hue control areas according to the calculated hue angle.

7. The color gamut mapping method of claim 6, wherein:

the controlling, by the saturation controller, of the saturation of the first chrominance component includes controlling the saturation of the first chrominance component by applying at least one of a first saturation gain, a second saturation gain, a third saturation gain, and a fourth saturation gain respectively corresponding to a first saturation control area, a second saturation control area, a third saturation control area, and a fourth saturation control area to the first chrominance component according to a result of comparing a saturation value of the first chrominance component to first to third saturation control points; and the controlling, by the hue controller, of the hue of the second chrominance component includes controlling the hue of the second chrominance component by applying any one of a first hue gain and a second hue gain respectively corresponding to a first hue control area and a second hue control area to the second chrominance component according to a result of comparing a saturation value of the second chrominance component to a hue control point.

8. The color gamut mapping method of claim 7, wherein the controlling, by the saturation controller, of the saturation of the first chrominance component includes:

when the saturation value of the first chrominance component is less than or equal to the first saturation control point, controlling the saturation of the first chrominance component by applying the first saturation gain to the first chrominance component;

when the saturation value of the first chrominance component is greater than the first saturation control point and is less than or equal to the second saturation control point, controlling the saturation of the first chrominance component by dividing the saturation value of the first chrominance component into a first saturation value and a second saturation value to respectively correspond to the first saturation control area and the second saturation control area using the first saturation control point and by summing a value obtained by applying the first saturation gain to the first saturation value and a value obtained by applying the second saturation gain to the second saturation value;

when the saturation value of the first chrominance component is greater than the second saturation control point and is less than or equal to the third saturation control point, controlling the saturation of the first chrominance component by dividing the saturation value of the first chrominance component into a first saturation value, a second saturation value, and a third saturation value to respectively correspond to the first saturation control area, the second saturation control area, and the third saturation control area using the first and second saturation control points and by summing all of a value obtained by applying the first saturation gain to the first saturation value, a value obtained by applying the second saturation gain to the second saturation value, and a value obtained by applying the third saturation gain to the third saturation value; or when the saturation value of the first chrominance component is greater than the third saturation control point, controlling the saturation of the first chrominance component by dividing the saturation value of the first chrominance component into a first saturation value, a second saturation value, a third saturation value, and a fourth saturation value to respectively correspond to the first saturation control area, the second saturation control area, the third saturation control area, and the fourth saturation control area using the first to third saturation control points and by summing all of a value obtained by applying the first saturation gain to the first saturation value, a value obtained by applying the second saturation gain to the second saturation value, a value obtained by applying the third saturation gain to the third saturation value, and a value obtained by applying the fourth saturation gain to the fourth saturation value.

9. The color gamut mapping method of claim 1, wherein the preprocessor uses the corrected three-color signals obtained by performing white balance correction on three primary color signals of the input image as the first three-color signals, and the color gamut mapping method further comprises extracting a gray area by comparing a maximum value among grayscale differences between the first three-color signals to a gray parameter and excluding the extracted gray area in a subsequent color gamut mapping process.

10. A color gamut mapping device comprising:

a preprocessor configured to extract and output grayscale differences between first three-color signals of an input image and extract and output brightness values of the first three-color signals;

a color space converter configured to convert the first three-color signals supplied from the preprocessor into a first luminance component and a pair of first chrominance components and output the first luminance component and the pair of first chrominance components;

a hue calculator configured to calculate and output a hue angle using the first chrominance components;

a hue axis selection unit configured to select and output hue axes of a corresponding control area in which the calculated hue angle is located among a plurality of control areas divided by a plurality of hue axes having different hue angles;

a parameter calculator configured to calculate and output a plurality of parameters including a plurality of saturation gains and a plurality of hue gains using a plurality of parameters, which are set to correspond to the selected hue axes, and the calculated hue angle;

a saturation controller configured to control a saturation of the first chrominance component for each control area using the calculated saturation gains and output a second chrominance component;

a hue controller configured to control a hue of the second chrominance component for each control area using the calculated hue gains and output a third chrominance component;

an overall controller configured to interpolate a set value of a luminance gain using grayscale differences between the first three-color signals supplied from the preprocessor, output a second luminance component by controlling the first luminance component using the interpolated luminance gain, and output a fourth chrominance component by controlling a saturation of the third chrominance component according to the brightness values supplied from the preprocessor; and a color space inverse converter configured to inversely convert the fourth chrominance component and the second luminance component, which are supplied from the overall controller into second three-color signals, and output the second three-color signals.

11. The color gamut mapping device of claim 10, wherein the overall controller is configured to:

entirely control the saturation of the third chrominance component by applying the overall saturation gains to the third chrominance component;

entirely control the hue of the third chrominance component whose saturation is entirely controlled by applying the overall hue gains to the third chrominance component whose saturation is entirely controlled; and control the saturation of the third chrominance component according to the brightness values using the third chrominance component whose saturation is entirely controlled as the third chrominance component.

12. The color gamut mapping device of claim 10, wherein the overall controller interpolates the set value of the luminance gain using a function below, $$Ygain_{out} = 128 + input_x \times \frac{Yset - 128}{256}$$

in the above function, $input_x$ denotes a maximum value $\max\{abs(R-G), abs(R-B), abs(G-B)\}$ among grayscale differences between the first three-color signals (R, G, and B), Yset denotes the set value of the luminance gain, and $Ygain_{out}$ denotes the interpolated luminance gain.

13. The color gamut mapping device of claim 10, wherein:

the preprocessor extracts a maximum value from among the first three-color signals as the brightness value and outputs the maximum value; and the overall controller controls the controlled saturation of the third chrominance component using the saturation gain set according to the brightness value or using the saturation gain obtained by interpolating the saturation gain set according to the brightness value.

14. The color gamut mapping device of claim 10, wherein:

the hue axis selection unit selects a first hue axis and a second hue axis which are assigned to a corresponding control area in which the calculated hue angle is located among 24 hue axes; and the parameter calculator is configured to, in the corresponding control area, calculate a first saturation gain, a second saturation gain, a third saturation gain, and a fourth saturation gain respectively corresponding to a first saturation control area, a second saturation control area, a third saturation control area, and a fourth saturation control area which are divided by a first saturation control point, a second saturation control point, and a third saturation control point having different saturation values, and in the corresponding control area, calculate a first hue gain and a second hue gain respectively corresponding to a first hue control area and a second hue control area which are divided by a saturation value of a hue control point.

15. The color gamut mapping device of claim 14, wherein the parameter calculator is configured to:

calculate the first to fourth saturation gains by linearly interpolating first to fourth saturation parameters of the first hue axis, which are set for each of the first to fourth saturation control areas to correspond to the first hue axis, and the first to fourth saturation parameters of the second hue axis, which are set for each of the first to fourth saturation control areas to correspond to the second hue axis, for each of the first to fourth saturation control areas according to the calculated hue angle; and calculate the first and second hue gains by linearly interpolating first and second hue parameters of the first hue axis, which are set for each of the first and second hue control areas to correspond to the first hue axis, and the first and second hue parameters of the second hue axis, which are set for each of the first and second hue control areas to correspond to the second hue axis, for each of first and second hue control areas according to the calculated hue angle.

16. The color gamut mapping device of claim 15, wherein the saturation controller controls the saturation of the first chrominance component by applying at least one of the first to fourth saturation gains respectively corresponding to the first to fourth saturation control areas to the first chrominance component according to a result of comparing a saturation value of the first chrominance component to the first to third saturation control points.

17. The color gamut mapping device of claim 15, wherein the hue controller controls the hue of the second chrominance component by applying any one of the first and second hue gains respectively corresponding to the first and second hue control areas to the second chrominance component according to a result of comparing a saturation value of the second chrominance component to the hue control point.

18. The color gamut mapping device of claim 16, wherein the saturation controller is configured to:
- when the saturation value of the first chrominance component is less than or equal to the first saturation control point, control the saturation of the first chrominance component by applying the first saturation gain to the first chrominance component;
- when the saturation value of the first chrominance component is greater than the first saturation control point and is less than or equal to the second saturation control point, control the saturation of the first chrominance component by dividing the saturation value of the first chrominance component into a first saturation value and a second saturation value to respectively correspond to the first and second saturation control areas using the first saturation control point and by summing a value obtained by applying the first saturation gain to the first saturation value and a value obtained by applying the second saturation gain to the second saturation value;
- when the saturation value of the first chrominance component is greater than the second saturation control point and is less than or equal to the third saturation control point, control the saturation of the first chrominance component by dividing the saturation value of the first chrominance component into a first saturation value, a second saturation value, and a third saturation value to respectively correspond to the first saturation control area, the second saturation control area, and the third saturation control area using the first and second saturation control points and by summing all of a value obtained by applying the first saturation gain to the first saturation value, a value obtained by applying the second saturation gain to the second saturation value, and a value obtained by applying the third saturation gain to the third saturation value; or
- when the saturation value of the first chrominance component is greater than the third saturation control point, control the saturation of the first chrominance component by dividing the saturation value of the first chrominance component into a first saturation value, a second saturation value, a third saturation value, and a fourth saturation value to respectively correspond to the first saturation control area, the second saturation control area, the third saturation control area, and the fourth saturation control area using the first to third saturation control points and by summing all of a value obtained by applying the first saturation gain to the first saturation value, a value obtained by applying the second saturation gain to the second saturation value, a value obtained by applying the third saturation gain to the third saturation value, and a value obtained by applying the fourth saturation gain to the fourth saturation value.

19. The color gamut mapping device of claim 10, wherein the preprocessor is configured to:
- use the corrected three-color signals obtained by performing white balance correction on three primary color signals of the input image as the first three-color signal; and
- extract a gray area by comparing a maximum value among grayscale differences between the first three-color signals to a gray parameter and exclude the extracted gray area in a subsequent color gamut mapping process.

* * * * *